(No Model.) 3 Sheets—Sheet 1.
H. LOEWENBACH.
CHECK, RECEIPT, OR OTHER STUB BOOK.
No. 519,769. Patented May 15, 1894.
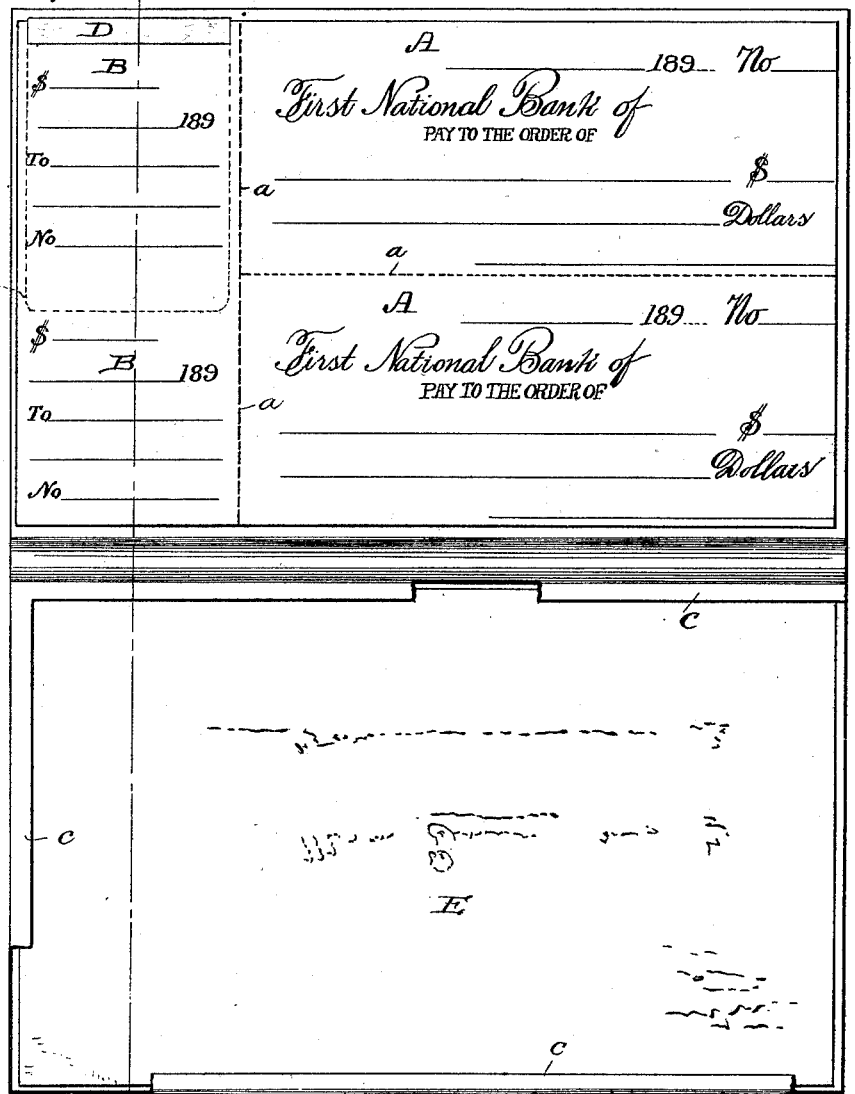
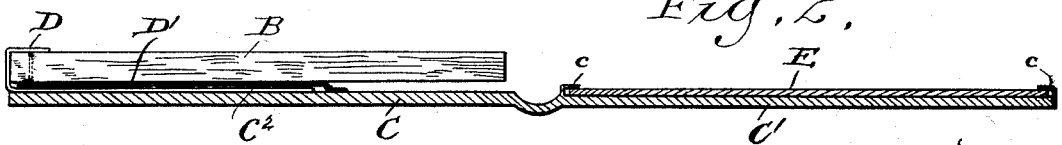
Witnesses
Geo. W. Young,
Wm Klug
Inventor
Hugo Loewenbach,
By H. G. Underwood
Attorney
THE NATIONAL LITHOGRAPHING COMPANY,
WASHINGTON, D. C.

(No Model.) 3 Sheets—Sheet 2.
H. LOEWENBACH.
CHECK, RECEIPT, OR OTHER STUB BOOK.
No. 519,769. Patented May 15, 1894.
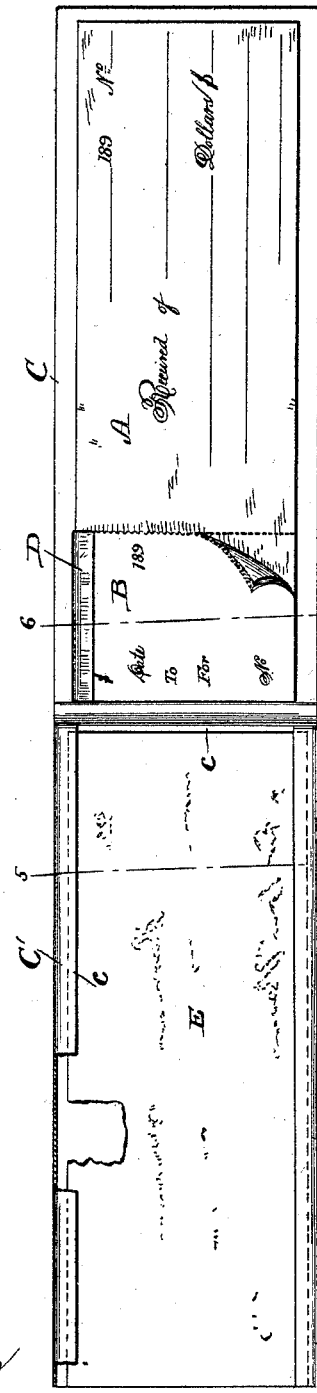
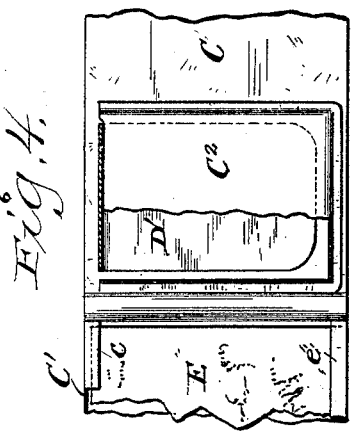
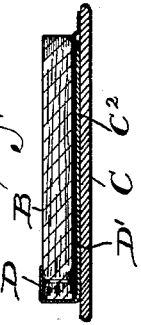
Witnesses
Geo. W. Young.
Wm Klug
Inventor
Hugo Loewenbach.
By H. G. Underwood
Attorneys (No Model.) 3 Sheets—Sheet 3.

H. LOEWENBACH.
CHECK, RECEIPT, OR OTHER STUB BOOK.

No. 519,769. Patented May 15, 1894.

UNITED STATES PATENT OFFICE.

HUGO LOEWENBACH, OF MILWAUKEE, WISCONSIN.

CHECK, RECEIPT, OR OTHER STUB BOOK.

SPECIFICATION forming part of Letters Patent No. 519,769, dated May 15, 1894.

Application filed August 19, 1891. Serial No. 403,146. (No model.)

*To all whom it may concern:*

Be it known that I, HUGO LOEWENBACH, a citizen of the United States, and a resident of Milwaukee, in the county of Milwaukee, and in the State of Wisconsin, have invented certain new and useful Improvements in Check, Receipt, or other Stub Books; and I do hereby declare that the following is a full, clear, and exact description thereof.

My invention relates to check, receipt and analogous stub books, and consists in certain peculiarities of construction as will be hereinafter set forth and subsequently claimed.

Figure 8:
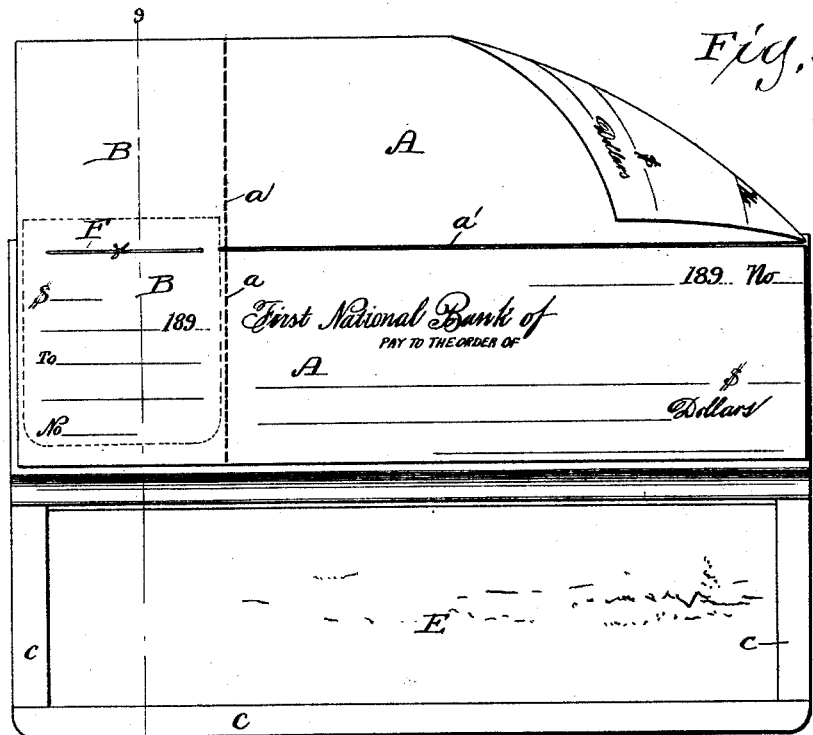
Figure 9:
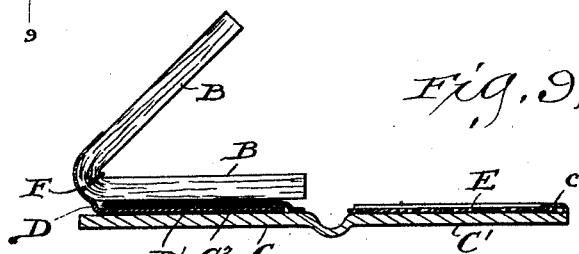
Figure 10:
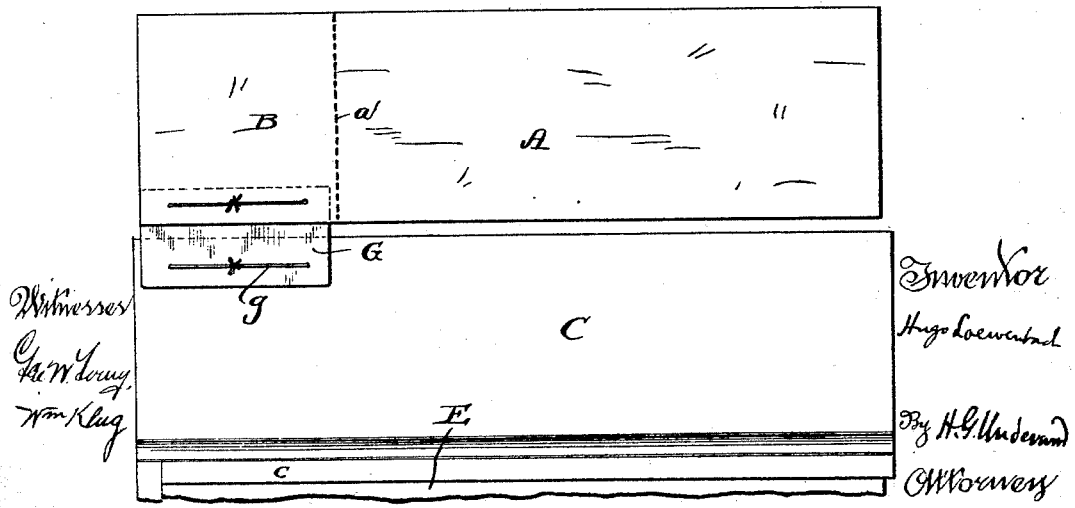

In the accompanying drawings:—Figure 1. is a plan view of one form of my present invention, partly broken away to better illustrate details of construction. Fig. 2. is a transverse vertical sectional view on line 2—2 of Fig. 1. Fig. 3. is a plan view partly broken away, of another form of my invention. Fig. 4. is a detail view illustrating features of construction of the form shown in the preceding figure. Figs. 5 and 6. are transverse sectional views taken on the lines 5—5, and 6—6, respectively, of Fig. 3. Fig. 7. is a detail view illustrating the tongue and stub connection. Fig. 8. is a plan view of another form of my invention. Fig. 9. is a transverse sectional view on line 9—9, of Fig. 8. Fig. 10. is a plan view of still another form of my invention, showing portions broken away.

In said drawings: A A indicate the body portions of the checks, B B, the stubs, C and C', the backings or covers for the stub book. The usual rows of perforations $a\ a$, are provided between the adjacent edges of the checks and their respective stubs, and when two or more checks are printed upon one page of the book, similar rows of perforations are provided between the adjacent edges of the several checks. The stubs of the several checks are bound together at their upper edges in such a manner as to permit said stubs to be turned upwardly to expose the entire surface of any desired one of the stubs below the same.

In the particular form of construction illustrated in Figs. 1 and 2, said stubs are bound together at their upper edges as shown at D, and a tongue D' is provided upon the under side of the series of stubs, which tongue is arranged to engage with a pocket $C^2$ on the inner surface of the portion C of the back or cover of the book. By this arrangement of the stubs, the same being securely bound together, and engaged with the cover by means of the tongue D' and pocket $C^2$, when all of the checks or receipts have been used, the entire series of stubs may be readily removed from the cover and a new series of checks or receipts with their appended stubs, substituted therefor. The portion C' of the cover is provided with a pocket covering nearly its entire surface, said pocket being conveniently formed by strips $c\ c$ attached to the outer edges of the inner surface of the said portion C' and extending inwardly for a slight distance from said edges, and beneath which the edges of a blotter E are engaged. One side of the pocket is preferably left open so as to render the blotter E readily removable.

The check or receipt book may be provided with a cover hinged along the lower edge or along one side of the book, that shown in Figs. 1 and 2 being hinged along the lower edge of the book, and the form illustrated in Fig. 3, being hinged at one end.

In the form of construction illustrated in Figs. 8. and 9, two pages of the check or receipt book are formed from each sheet, the perforations $a$ extending from the extreme upper edge to the extreme lower edge of the sheet and the said sheet being divided horizontally into two portions by a slit $a'$. The two portions of each sheet are printed on opposite sides as illustrated in Fig. 8, and a series of these sheets are placed together and stitched or otherwise secured together as at F, the bunch of printed sheets being then folded over as shown more particularly in Fig. 9, said bunch being then secured to a backing D having a tongue D' as before described.

In the particular form of construction illustrated in Fig. 10, the stubs are not made separable from the binding but are bound together at their upper edges and secured to a flexible strip G, which is in turn secured to the cover C of the book as at $g$, by stitching or in any other desired manner.

A great advantage gained by my improvement over the ordinary forms of check or receipt books, is that by the arrangement of the stubs to fold upwardly out of the way, said stubs being bound along their upper edges, the entire surface of the check or receipt together with its appended stub is exposed in such a manner as to permit said surface to be readily written upon and then blotted by means of a blotter affixed to the opposite cover of the book. It has been impossible to employ a blotter affixed to the cover of the book in the ordinary forms of construction owing to the fact that after one or more checks or receipts have been removed from the book, the stubs from which said checks or receipts have been detached will prevent the blotter from being pressed down into contact with the entire surface of the uppermost remaining check or receipt, while its appended stub will be entirely covered up by the stubs first used. It has therefore been necessary to use a separate blotter with check and receipt books of the ordinary construction, and this has been a source of great inconvenience and annoyance to the user from the liability of the separate blotter becoming lost. This disadvantage is present to a greater degree in small sized books designed to be carried in the pocket.

A great advantage gained by the described construction of the stubs so as to be removable, is that after all the checks or receipts in the book have been used, the entire series of stubs may be removed and preserved for reference, and a new series substituted therefor. In this manner, one cover may be continuously used for a great many series of checks or receipts, and it may be made of finer materials and more handsomely gotten up than would be desirable if the binding or cover were rendered useless after all the checks or receipts were used out of it as in the ordinary forms of construction.

Having thus described my invention, what I claim as new, and desire to secure by Letters Patent of the United States, is—

1. A check, receipt or other stub-book having a plurality of leaves, the edges of the leaves being left free, each detachably secured at one end to a stub B, said stubs being bound together at their upper edges by a backing D, provided with a tongue D', engaging with a pocket C², on the inner surface of one side of the cover C, and arranged to fold up and disclose the stub immediately beneath, all substantially as described.

2. A check, receipt or other stub-book having a plurality of leaves, the edges of the leaves being left free, each leaf being detachably secured at one end to a stub B, said stubs being bound together at their upper edges by a backing D, provided with a tongue D', engaging with a pocket C², on the inner surface of one side of the cover C, and each arranged to turn up and disclose the stub immediately beneath and a blotter removably secured in a pocket in the other side of the cover C', by strips c, c, all combined and arranged substantially as described.

In testimony that I claim the foregoing I have hereunto set my hand, at Milwaukee, in the county of Milwaukee and State of Wisconsin, in the presence of two witnesses.

HUGO LOEWENBACH.

Witnesses:
JOHN E. WILES,
N. E. OLIPHANT.